United States Patent Office 3,108,990
Patented Oct. 29, 1963

3,108,990
PROCESS OF STABILIZING PHENOL FORMALDEHYDE RESIN
Gene F. Baxter, Seattle, Wash., assignor, by mesne assignments, to Weyerhaeuser Company, Tacoma, Wash., a corporation of Washington
No Drawing. Filed May 22, 1958, Ser. No. 736,985
7 Claims. (Cl. 260—45.7)

This invention relates to a process of stabilizing resins and, more particularly, appertains to improving the storage-life properties of highly alkaline, high molecular weight, phenol-formaldehyde resins.

Most phenol-aldehyde resins are known to have shortened storage life due to viscosity changes, and because of the formation of insoluble scum on the surface of the resin.

With respect to viscosity, the same gradually increases with stored resins from day to day until it reaches a viscosity where the resin may no longer be used. The rate of viscosity increase in any particular resin is usually dependent on the storage temperature. While the problem is minimized in the cooler winter months, or under low temperature storage conditions, cool storage is difficult if not impossible to maintain in the summer months, or in most heated factories. The protraction of viscosity increase is most desirable.

Phenolic resins also scum during storage. A resin scum is an insoluble film which must be removed and discarded. This is wasteful practice and is often difficult or impossible when the resin is stored in drums from which it must be poured or pumped. Scum films close container openings, plug valves and pumps, and generally their formation is to be avoided for economic and utility reasons. The formation of scum is particularly a problem with phenol-formaldehyde resins that are highly alkaline and highly advanced during condensation. Such resins are those widely used in waterproof plywood adhesives and as bonding agents for reconstituted fibrous boards, particle and chip boards, and the like. The formation of scum is associated with oxidation at the surface of stored resin. If it were practical to store such resins in oxygen-free atmospheres the problem would be largely obviated. The problem therefore is primarily due to instability of the resin at its surface when exposed to air.

It has been among the more important objects of this invention to stabilize a phenol-formaldehyde resin by a new process which improves its storage life without affecting its basic properties; to stabilize such a resin against the effects of oxidation; to stabilize a highly alkaline phenol-formaldehyde resin so that viscosity increase during protracted storage is slowed; to stabilize a phenol-aldehyde resin in such a way as to overcome "scumming" during storage; and to simply stabilize such a resin to accomplish these objects by a simple process without substantial variation of the primary utility of the resin.

These and other objects are attained by condensing a phenol and an aldehyde under alkaline conditions in the presence of heat whereby a highly alkaline, highly advanced, high molecular weight resin is produced. To such a resin I add an amount of material capable of producing sodium sulfite in the resin in a molar ratio of 0.003 to 0.13 mole per mole of phenol in the resin. Alternatively, I may add sodium sulfide to the resin in the above amounts.

My invention will be more fully described in greater detail in conjunction with specific examples which, of course, are primarily recited to illustrate the invention without intention to unduly limit the scope thereby.

RESIN A

A pertinent resin condensation product is derived by reacting 1 mole of 90% phenol with 2.25 moles of 37% formaldehyde in the presence of 0.075 mole of sodium hydroxide at temperatures between about 80° and 100° C. until the viscosity reaches about 627 centistokes, a centistoke being a kinetic viscosity value based on Gardner-Holdt viscosity tubes read at 25° C. Upon attaining such a viscosity an additional 0.1 mole of NaOH is added and the reaction continued until the viscosity reaches about 756 centistokes whereupon the resin is cooled. This terminates the reaction. The final resin viscosity will be 1070 centistokes and it will have a solids content of about 45% and will contain 7% NaOH. This resin pH is above 12.0.

RESIN B

A variation of the foregoing resin also involves phenol, formaldehyde and caustic, the latter being limited to 6.7% NaOH. The final resin has a 43% solids content and a final viscosity of about 550 centistokes. The resin pH is 12.7.

Resins A and B to which my invention is particularly applicable, are those of the types described in detail in the Redfern Reissue Patent No. 23,347 and others of similar nature. These resins are distinguishable from Novolac and acid resins to which the invention is inapplicable.

These resins are of the multiple caustic addition type. They are thermo-setting, highly alkaline, having a pH above about 10.0 and up to 14.0. Also they are highly advanced toward the C-stage and are typically useful where fast-setting resins are required, for example in plywood and other laminating adhesives and for fiber bonding.

RESIN C

A resin of 37.5% solids content, to which this invention appertains, is derived by condensing 1 mole of phenol with 2.33 moles of formaldehyde with a single addition of 0.088 mole of NaOH. The reaction is carried on at 80° C. until a viscosity of 212 centistokes is attained whereupon cooling is brought about to terminate the reaction. The final resin will have a viscosity of about 300 centistokes, and a 37.5% solids content. The resin pH is 11.4.

RESIN D

Still another pertinent resin is produced by combining and reacting at between 70° C. and 95° C., 1.7 moles of formaldehyde with 1 mole of phenol in the presence of 0.052 mole of NaOH. When the reaction produces a viscosity of 370 centistokes the product is cooled and has a final viscosity of 435 centistokes and a solids content of 28%. The resin pH is 10.9.

While these resins A, B, C and D are typical of those to which this invention is applicable and with which it is useful, it will be apparent to those skilled in the art, to which this disclosure is directed, that other specific resins may be treated to prevent scumming, and protract viscosity rise during storage, all without departing from the spirit and scope of this invention.

I have found that materials capable of providing sodium sulfite in solution in the phenolic resins will accomplish my purposes. A primary choice obviously is sodium sulfide per se. Others are sodium bisulfite, sodium metabisulfite, sulphurous acid, and sulfur dioxide. Mixtures thereof may also be employed for my purposes so long as a suitable molar ratio of an additive, expressed as sodium sulfite, in the ratio from 0.003 to 0.13 mole of sodium sulfite per mole of phenol in the resin is present. I have also found that sodium sulfide is effective in preventing scumming and in lengthening the storage life of the foregoing phenolic resin. Additionally, hydrogen sulfide may be employed with the same beneficial effect.

The selected anti-oxidation additive is dissolved in the resin solutions being stabilized preferably when the reaction of the phenol and formaldehyde is completed. Practically, the additive is placed in solution with the resin during cooling although it may be added after the resin is cooled to room temperature. Addition of the selected material while the resin is cooling insures faster dissolution and is a convenient time due to stirring that normally occurs as temperature is reduced.

To demonstrate how my invention inhibits the formation of surface scum on phenol-aldehyde resins a series of experiments were performed. In each instance 100 mls. of Resin B and an additive dissolved therein were placed in each of several flasks from which the air was swept by a stream of oxygen whereupon the flasks were tightly stoppered. The additives were used in varying amounts. Sodium sulfite or sodium sulfide or hydroxylamine or sodium nitrite was included with the resin in a particular flask. One flask contained resin only to serve as a control. These flasks were shelved and observations of the resin in the oxygen enriched atmosphere, as to scum formation and color change, were made approximately 17–18 hours after stoppering. The results are reported as follows:

*Table I*

| Additive | Moles additive per mole phenol | Observations made | |
|---|---|---|---|
| | | Color of resin | Scum formation |
| Sodium sulfite ($Na_2SO_3$) | 0.0003 | Red | Scummed. |
| | 0.003 | Slight red | No scum. |
| | 0.03 | Orange | Do. |
| Sodium sulfide ($Na_2S$) | 0.05 | Slight red | Do. |
| Hydroxylamine ($NH_2OH$) | 0.11 | Green | Scummed. |
| Sodium nitrite ($NaNO_2$) | 0.05 | Red orange | Do. |
| No additive | 0 | Red | Do. |

It will be noted that scum formed on the resin surface when 0.0003 mole of sodium sulfite was added per mole of phenol thus indicating insufficient additive. Likewise scum and color changes occurred with hydroxylamine, sodium nitrite and where no additive was used as in the control flask. On the other hand scumming did not occur under the oxygen-enriched atmosphere when as little as 0.003 mole sodium sulfite per mole phenol was employed, and there was only slight if any color change. When 0.05 mole of sodium sulfide was present scumming was likewise prevented.

Improved storage life properties of the resins also accrue as a result of adding a selected material from the group described above. This relates particularly to the protraction of viscosity rise. To put it another way, viscosity of a stored resin progressively increases with the passage of time. When a stored resin, irrespective of its initial viscosity, attains a Gardner-Holdt viscosity of $Z_6$ (14,800.00 centistokes) it is no longer practically useful.

To demonstrate the effect of the anti-oxidants on Resins A, B, C and D with respect to protracting storage-life through the addition of sodium sulfite, specimens of each resin had small portions of $Na_2SO_3$ dissolved therein and were placed in sealed Gardner-Holdt tubes. An untreated control specimen of each resin was also provided. The several tubes were shelved at room temperature and viscosity was observed daily until each specimen attained a Gardner-Holdt viscosity of $Z_6$. The number of days in each instance was recorded and the percent increase was calculated. Tabulated results follow:

*Table II*

| | Moles $Na_2SO_3$ added per mole phenol | Days to reach $Z_6$ | Percent increase over control |
|---|---|---|---|
| Resin A | [1] 0 | 45 | |
| M/R 2.25 | 0.03 | 81 | 80 |
| | 0.06 | 104 | 131 |
| Resin B | [1] 0 | 72 | |
| M/R 2.25 | 0.02 | 95 | 32 |
| | 0.03 | 128 | 78 |
| | 0.06 | >180 | >150 |
| Resin C | [1] 0 | 27 | |
| M/R 2.3 | 0.06 | 40 | 48 |
| | 0.13 | 59 | 119 |
| Resin D | [1] 0 | 33 | |
| M/R 1.7 | 0.04 | 58 | 76 |
| | 0.07 | 84 | 155 |

[1] Control.

It has been demonstrated that the addition of small quantities of sodium sulfite to a phenolic resin does not affect its resin adhesive properties for use in plywood production. This was accomplished as follows:

1180 lbs. of Resin B at room temperature was warmed in a resin kettle to about 40° C. This warmed resin then had 20 lbs. of sodium sulfite added under agitation. After about 15 minutes of mixing the added sulfite was fully dissolved. The resin was then cooled to 25° C. and removed from the kettle. The solids content was 44%. Its Gardner-Holdt viscosity was T or 500 centistokes. The pH was 12.7, characteristic of a highly alkaline phenolic resin, there being 6.7% of NaOH included. The specific gravity was 1.197 at 25°/25°. Molar ratio of the sulfite to the phenol in Resin B was 0.0513 mole sulfite per mole of phenol.

A glue was compounded by placing 130 lbs. of water at 70° F. in a jacketed glue mixer kettle and 67.5 lbs. of "Furafil 100" (a finely ground, dry, lignocellulosic by-product of the hydrolysis of agricultural residues such as corn-cobs, oat hulls, and the like. "Furafil 100" is a proprietary product of The Quaker Oats Co.) was added followed by a short stir. Thereupon 19 lbs. of caustic soda (50% solution) was introduced and mixing continued for 15 minutes. Then 14.5 lbs. of soda ash was stirred into the mixture and coolant water was circulated in the kettle jacket. To the cooled mass was slowly added 500 lbs. of Resin B accompanied and followed for 5 minutes by thorough mixing. The total product weighed 731 lbs.

This glue was spread on Douglas fir 1/10" core stock at an average rate of 57 lbs. of wet glue per 1000 square feet of double glue line. The cores were assembled with face veneers into panels of 1/2" thickness in conventional plywood assembly fashion. The assemblies were hot pressed at a platen temperature of 270° F. for 5½ minutes under a pressure of 180 p.s.i.

Test specimens were entirely acceptable to meet current requirements for exterior plywood as to the nature and strength of the bond. In other words, no deleterious effects of the sodium sulfite on the resin or on the compounded glue were noted despite careful observation for the same.

While I have primarily described the use singly of the recited anti-oxidants it will be obvious that mixtures of the same will likewise be useful and operative. The important consideration is that the additive materials, expressed as sodium sulfite, be present in the phenolformaldehyde resin, as typically described, in the ratio of from 0.003 to 0.13 mole of anti-oxidant material to one mole of phenol in the resin.

The additive materials employed in stabilizing the resin do not affect its water solubility which is to be maintained, particularly for plywood glue uses. In the molar ratios employed they likewise have little or no effect on the overall costs involved and, in fact, their cost is offset by the avoidance of wasteful loss of resin solids due to scumming.

Having thus described my invention, I claim:

1. The process of stabilizing resins comprising: to a water soluble, pH 10.0 to 14.0 phenol-formaldehyde resin adding an antioxidant material selected from the group consisting of sodium sulfite,
sodium bisulfite,
sodium metabisulfite,
sulfur dioxide,
sulfurous acid,
sodium sulfide, and
hydrogen sulfide,
and mixtures thereof;

said selected material being added after completion of condensation of the resin; said addition, expressed as sodium sulfite, being in the molar ratio range from 0.003 to 0.13 mole of additive per mole of phenol in the resin, said resin having a molar ratio of about 1:1.7 up to about 1:2.33 phenol to formaldehyde.

2. The process of stabilizing resins, comprising: to a water soluble, pH 10.0 to 14.0, phenol formaldehyde resin adding sodium sulfite at a molar ratio between 0.02 and 0.06 mole of sodium sulfite per mole of phenol in the resin; said addition being made after completion of condensation of the resin, said resin having a molar ratio of about 1:1.7 up to about 1:2.33 phenol to formaldehyde.

3. The product of the process of claim 2.

4. The process of claim 1 in which the selected material is sodium bisulfite.

5. The process of claim 1 in which the selected material is sodium metabisulfite.

6. The process of claim 1 in which the selected material is sulfurous acid.

7. The process of claim 1 in which the selected material is sodium sulfide.

References Cited in the file of this patent
UNITED STATES PATENTS

| | | |
|---|---|---|
| 2,397,019 | Kroeger et al. | Mar. 19, 1946 |
| 2,591,634 | Taat et al. | Apr. 1, 1952 |
| 2,848,436 | Christenson | Aug. 19, 1958 |